United States Patent
Sergel et al.

(10) Patent No.: US 6,699,344 B2
(45) Date of Patent: *Mar. 2, 2004

(54) PROCESS FOR PRODUCING A VEHICULAR PNEUMATIC TIRE

(75) Inventors: Horst Sergel, Hannover (DE); Heinrich Huinink, Garbsen (DE); Wolfgang Holzbach, Garbsen (DE)

(73) Assignee: Continental Aktiengesellschaft, Hannover (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/290,397

(22) Filed: Apr. 13, 1999

(65) Prior Publication Data

US 2001/0035255 A1 Nov. 1, 2001

(30) Foreign Application Priority Data

Apr. 16, 1998 (DE) .......................... 198 16 849

(51) Int. Cl.$^7$ .............................................. B29D 30/60
(52) U.S. Cl. ................. 156/130; 152/152.1; 152/209.5; 152/DIG. 2; 156/117; 156/128.1; 156/130.5
(58) Field of Search ................... 156/117, 130, 156/397, 128.1, 111, 130.5, 123; 152/152.1, DIG. 2, 209.5

(56) References Cited

U.S. PATENT DOCUMENTS

| 3,170,499 A | * | 2/1965 | Deist .......................... 156/397 |
| 3,223,572 A | * | 12/1965 | Holloway et al. ........... 156/130 |
| 4,147,577 A | * | 4/1979 | Kobayashi et al. .......... 156/130 |
| 5,937,926 A | * | 8/1999 | Powell ..................... 152/152.1 |
| 5,942,069 A | * | 8/1999 | Gerresheim et al. ...... 152/152.1 |
| 6,039,826 A | * | 3/2000 | Okada ........................ 156/117 |
| 6,044,882 A | * | 4/2000 | Crawford et al. ......... 152/152.1 |

FOREIGN PATENT DOCUMENTS

| EP | 729825 | * | 9/1996 | ............... 156/110.1 |
| EP | 0747243 | | 12/1996 | |
| EP | 0875367 | | 11/1998 | |

OTHER PUBLICATIONS

English language abstract for JP10–193,475, patent Abstracts of Japan.
"Stripwinding: Another Way to Produce Composites", R.A. Cronin, Elastomerics, Aug. 1987, pp. 24–27).

* cited by examiner

*Primary Examiner*—Geoffrey L. Knable
(74) *Attorney, Agent, or Firm*—Smith, Gambrell & Russell, LLP

(57) ABSTRACT

A process is disclosed for producing a vehicular pneumatic tire, in which, in order to produce and apply a preferably unvulcanized tread strip to a partial tire, which already has a cambered carcass and a ply packet radially outward therefrom, at least two strips of material, each consisting of a mixture of rubber and/or plastic, are applied to the partial tire. At least one strip of material is wound in numerous essentially adjoining windings running in the circumferential direction of the tire. In the case of two strips of material, these consist of different mixtures and, depending upon the desired characteristics of the tire, are arranged simultaneously or sequentially on different areas in the inner or the radially outer zone of the space occupied by the finished tread strip.

10 Claims, 3 Drawing Sheets

PROCESS FOR PRODUCING A VEHICULAR PNEUMATIC TIRE

INTRODUCTION AND BACKGROUND

The present invention pertains to a process for producing a vehicular pneumatic tire in which, in order to produce and apply a preferably unvulcanized tread strip to a partially completed tire which already has a cambered carcass and a ply packet radially outward therefrom, at least two strips of material, each consisting of a mixture of rubber and/or plastic, are applied to the partial tire, while at least one strip of material is wound in numerous essentially adjoining windings running in the circumferential direction of the tire.

A process for producing a vehicular pneumatic tire, in which a strip of rubber material is wound in numerous essentially adjoining windings around a partial tire, is known from the state of the art (e.g., R. A. Cronin: Elastomerics, August 1987, pages 2427). The advantages of this process lie specifically in the fact that only small extruders need to be made ready for the treadstrip mixtures.

Various demands are placed on the tread strip of a vehicular pneumatic tire. For instance, the part of the tread strip that has direct contact with the roadway must have optimal road grip. At the same time, resistance to wear, roll resistance and adequate grounding capability for electrostatic charges should be optimized. Heretofore, a single rubber mixture was used for the part of the tread strip that makes contact with the roadway. This rubber mixture must fulfill almost all demands. However, it is disadvantageous that each characteristic of the mixture coming into contact with the roadway can be varied only within certain limits so as not to negatively affect other characteristics.

In order to optimize still further the characteristics of the vehicular pneumatic tire, it is known that the tread strip can be made up of two parts of different mixture compositions running in the radial direction. Thus, part of the tread strip coming into contact with the roadway (cap) should already possess the characteristics cited above as to wear, adherence and resistance to roll. At the same time, the base rubber mixture directly beneath the cap rubber mixture should be optimized in such a way that, e.g., the resistance to roll is positively affected.

The production of such unvulcanized tire tread strips is usually accomplished with an extruder, the nozzle of which determines the pattern of the tread strip slug. However, it is not easily and uncomplicatedly possible, e.g., to provide different zones of the surface of the tread strip (e.g., shoulder area and midsection) coming into contact with the roadway with mixtures of different composition, e.g., in order to improve the traction of the tire still further. Specifically, complicated extruder nozzles would be required in order to divide the tread strip slug into appropriately different zones with different mixtures. Furthermore, in the customary process for building tires, in which the tread strip slug is designed as a complete component, there exists the problem that the two ends of the tread strip slug form an abutment point (splice) where they are joined together. This splice must be separately pretreated (coated with a naphtha solution) in order to ensure adequate adhesion of the two ends.

It is therefore a fundamental objective of the present invention is to make available a vehicular pneumatic tire, the tread strip of which has outstanding characteristics in driving operation and can, at the same time, also be produced in a simple and uncomplicated process.

SUMMARY OF THE INVENTION

The above and other objects can be achieved according to the invention, in that, in the case of two strips of material, these consist of different mixtures and, depending upon the desired characteristics of the tire, they are arranged simultaneously or sequentially on different areas in the inner or the radially outer zone of the space occupied by the finished tread strip.

In keeping with the invention, the process of the winding of a strip of material to form the tread strip can be modified in such a way that the totality of the tire characteristics can be considerably improved. For the production of such a vehicular pneumatic tire, two or more essentially flat strips of material (preferred ratio of width to thickness >7:1) of rubber and/or plastic are used. In principle, it is also possible to apply several adjoining strips of material in the longitudinal direction. The individual strips of material consist of a single mixture of rubber and/or plastic and are arranged on their respective zones in the tire. The mixture of rubber and/or plastic also contains, in addition to the respective polymers customarily used in the tire art (e.g., SBR, BR, NR), customary fillers (e.g., carbon black, silica), and additives (e.g., sulfur, accelerators, processing adjuvants).

In the winding of the material strips according to the invention, no splice results as in the case of the conventional tire building process. Since the strip of material is wound while warm and therefore has sufficient adhesiveness, the use of naphtha containing adhesion enhancers can be dispensed with.

It is especially advantageous when the radially inner part of the tread strip (base) and the part between the base and the surface (cap) coming into contact with the roadway is produced from at least two different strips of material. In this way it is possible that the strip of material forming the base layer can be first wound on completely. After the application of the base layer, there follows the winding on of the next strip of material which forms the cap. Ideally, however, the cap and the base are applied simultaneously. So it is possible that, e.g., beginning at an axial limit of the tire slug, the material strip of the base is first applied by winding and offset therefrom (offset, e.g., by one winding) e.g., a strip of material of the cap mixture is applied to the wound strip of material of the base mixture. Using such a procedure, the tire tread strip slug is completed especially in a timely fashion. In a conventional cap and base buildup, large extruder facilities with complicated nozzles were required in order to prepare such a vehicular pneumatic tire. It is also possible in keeping with the invention to undertake rapid and uncomplicated conversion to various mixtures in order to ensure optimal adaptation of the production, e.g., from summer to winter tires.

It is also advantageous when the radially inner part of the tread strip (base) and parts forming the surface of the tread strip coming into contact with the roadway are formed from a strip of material filled with a carbon black base mixture and that the remaining areas between the base and the surface coming into contact with the roadway are filled by winding on a second strip of material of a cap mixture or by inserting a single thick strip. The thickness of the zone occupied by the base mixture (in the radial direction) in certain zones of the tire and depending upon the dimension of the tire, is 2–5 mm and in other zones corresponds with the total thickness of the tread strip. The zones that do not have the full thickness of the tread strip are filled in by winding on a second strip of material or by inserting a single thick strip.

The winding on of a second strip of material, which consists of a cap mixture, can preferably be accomplished during the winding of the strip of base material, e.g., with a different rate of advance. The mixture of the second strip of material or the single strip preferably contains silica as a filler. The advantage of such a combination lies in the fact that running surface mixtures containing silica impart to the tire a slight resistance to roll and good skid characteristics on wet pavement although it does impart to the tread strip a low grounding capability due to its low electrical conductivity. With the combination mixture containing carbon black and silica according to the invention in the surface of the tread strip coming into contact with the roadway, the strip of material containing carbon black, which is itself in contact with conductive layers of the tire (e.g., the rubber coating of the bracing ply) ensures the grounding of electrostatic charges.

In this embodiment, it is highly desirable that the winding of the strip of material containing carbon black be accomplished in such a way that it is continuously in the surface coming into contact with the roadway. However, it is also possible in principle, by means of a suitable winding advance or by using a great number of strips of material with appropriate mixtures, to insert the mixture layer containing carbon black in drop form into the surface coming into contact with the roadway so that no encircling conductive band is formed. The "gaps" formed thereby are then filled in with the strip of material of the rubber mixture of the cap. In principle, it is also possible that two rubber mixtures containing carbon black form the material strip of the cap and base mixture. As already noted, it is here also advantageous when the strips of material are applied at the same time, since this facilitates a more rapid production of the vehicular pneumatic tire.

In an advantageous fashion, at least two strips of material of different mixtures can be wound onto the partial tire in such a way that the surface of the finished tire coming into contact with the roadway has alternating areas, which are formed from the respective individual mixtures of the strips of material. It is possible in that way, e.g., that in the finished tire raised areas of the pattern (ribs, bumps) have a very precise mixture composition, while the grooves or the edges of bumps of the pattern have a different composition. This makes it possible for the mixture composition of the tire to adapt better to roadway conditions.

It is especially advantageous when, in the finished tire, at least the two radially outer shoulder areas of the tread strip (e.g., cap and base part or only the cap part) each consist of a strip of material of a winter mixture. Then the traction of the tire, especially when manipulating curves, is optimized, so that an adaptation to the roadway conditions can ensue more readily. The shoulder area is the peripheral part of the tire, which maximally occupies 15% of the axial extension of the tread strip, related to the new tire, coming into contact with the roadway. Here it is again preferred that the entire radially outer zone of the tread strip, which comes into contact with the roadway, be made of a strip of material which imparts good winter driving characteristics to the tire in the vulcanized state.

It is especially advantageous when the areas forming the surface of the tread strip coming into contact with the roadway, in which tread patterns (fine incisions or grooves) are formed during the vulcanization, are formed from a strip of material with a higher electrical conductivity in the vulcanized state and, in the forming of the tread incisions, the mixture of this strip of material is brought into contact with another mixture, which also has a high electrical conductivity.

In the formation of the tread incisions, raised areas of the vulcanization form (lamellar strips of metal and lands) are pressed into the slug during the vulcanization process. Since, e.g., the strip of metal does not cut the mixture but merely displaces it, the mixture at the surface is carried radially inward by the strip of metal, and can there make contact with a conductive mixture, which is located radially inside the tire (e.g., the base mixture or the rubber coating of the bracing ply). The grounding of electrostatic charges can then ensue via a conductive mixture of crosslinked rubber and/or plastic. This mixture is found essentially only in the area of the lamellar edges or the edges of the tread bumps, yet coming into contact with the surface contacting the roadway. This strip of material, which is applied to the surface of the tread strip, preferably contains carbon black as a filler, so that it has sufficient conductivity. The rest of the surface coming into contact with the roadway preferably contains silica as a filler, since the positive characteristics already mentioned, such as reduced resistance to roll and good skid behavior on wet pavement, are positively influenced thereby. Advantageously, the material strip conductive in the vulcanized state is also wound on.

The process according to the invention can be used for producing recapped tires and new tires. Especially favored is the use of the process according to the invention, in which a partial tire is prepared in processing step A to the point that the air-impervious inner layer, one or more layers of the carcass, optionally the bead core or the additional layers reinforcing the bead area, one or more belted layers and optionally a single or multiple part binding band form the partial tire. According to the application, the belted layers and optionally the binding band and/or optionally other reinforcing layers are formed radially above the carcass and encompassing the term "belt reinforcement." It is furthermore possible that parts of the tread strip, e.g., a tread strip substrate and/or a tread strip base layer, be applied to the partial tire as the radially outermost layer. This partial tire (A) is essentially vulcanized completely.

The vulcanization process is preferably carried out in a vulcanization form, which makes it possible to impart to both the surface and the strength element(s) a predetermined crosssectional contour. In this manner a partial tire is obtained, which can be simply and uncomplicatedly completed in the subsequent process step B. This makes it possible to influence and achieve tire uniformity.

The essentially vulcanized partial tire can be stored for a longer period of time, so that the decision as to the manner in which the tire is to be completed (e.g., relative to the tread strip mixture or the profile of the tread strip) can be postponed to a later point in time. The tire manufacturer is then in a position to react appropriately and promptly to the demands of the market. The advantage of this process lies in the fact that with an essentially fully vulcanized partial tire without a profiled tread strip, e.g., the tread strip substrate or the tread strip base layer, rests against the inner wall of the heated form during vulcanization, so that due to inner pressure in the form, no displacements can be caused in the woven structure of the belted binding, as is occasionally observed in the common vulcanization of belt layers and the tread strip, on which profiled bumps must be pressed by inner pressure in the form.

The vulcanization steps A and B may also be distinguished in such a way that the partial tire is produced in processing step A by fabricating an air-impervious inner layer, a carcass containing strength elements, optionally belt cores and optionally rubber layers reinforcing the belt area and at least one belted layer and, in production step B, the partial tire is built into a complete tire by adding the unvulcanized single or multiple part binding band and the complete tread strip. The application of a single or multiple part binding band, which also consists of strength elements, usually textile e.g., nylon embedded in rubber, and the tread strip in processing step B has the advantage that in the finished tire a longitudinal tension uniformly distributed over the width of the tire is realized, which is influenced in the tire contour by variable tension application, by imparting a contour to the partial tire which varies from the contour imparted in processing step B, thus making it deliberately possible to optimize certain tire characteristics, such as wear or high speed capability.

Further design possibilities in respect to processing steps A and B and their advantages are set forth in DE 19,507,486 A1 which is relied on and incorporated herein by reference.

BRIEF DESCRIPTION OF THE DRAWINGS

The present invention will be further understood with reference to the accompanying drawings, wherein.

DETAILED DESCRIPTION OF INVENTION

Figure 1:
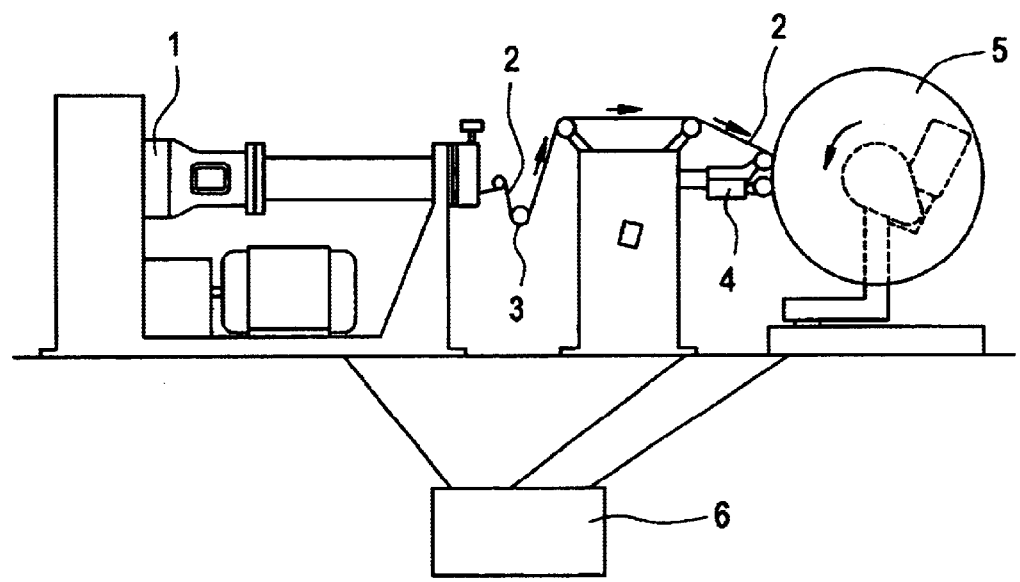
FIG. 1 is a schematic representation of a device for carrying out the process according to the invention.

Illustrated in FIG. 1 is an extruder (1), from which a strip of material (2) is extruded, which, due to the configuration of the nozzle of the extruder, has a round cross section. This round rope-like strip of material (2) consists of a rubber mixture. Any suitable rubber formulation used in the tire industry can be utilized for purposes of this invention. Via diversion rollers (3) and a not further illustrated roller mechanism, the extruded round ropelike strip of material (diameter for example approximately 1 cm) is converted into a flat rectangular crosssectional form (approximately 16×2 mm).

The partial tire (5), which is mounted so as to be freely rotatable, is driven by a support head (4). By means of a computer control (6), beginning with the extrusion of the strip of material (2) and over the movable support head (4), the now flattened strip of material is wound with its broad side onto the partial tire (5). The winding on of the strip of material is accomplished in such a way that one or two windings of the strip of material (2) are wound onto the sidewall of the partial tire and subsequently the tire tread strip is wound on in the circumferential direction of the tire from one axial limit to its other axial limit. By way of the computer control (6), the determination is made as to the extent to which the windings of the strips of material overlap. Here it is also possible, however, that the windings of the strips of material adjoin one another in the circumferential direction of the tire merely by impact.

The support head (4) is so regulated that it is displaced a total of 115 mm in the axial direction of the tire per rotation of the partial tire (5). By means of an appropriate control system (6), it is possible to influence the thickness of the tread strip or to move the support head (4) several times from one axial side to the other in order to let the strip of material wind on. By way of a not further described roll-on action, the strip of material (2) is pressed onto the partial tire (5). It is also possible to wind on two strips of material beginning at the respective axial limit of the partial tire (5). These strips of material can have an identical or a different composition. It is particularly advantageous when both of these strips of material are applied essentially simultaneously to the partial tire (5).

Figure 2:
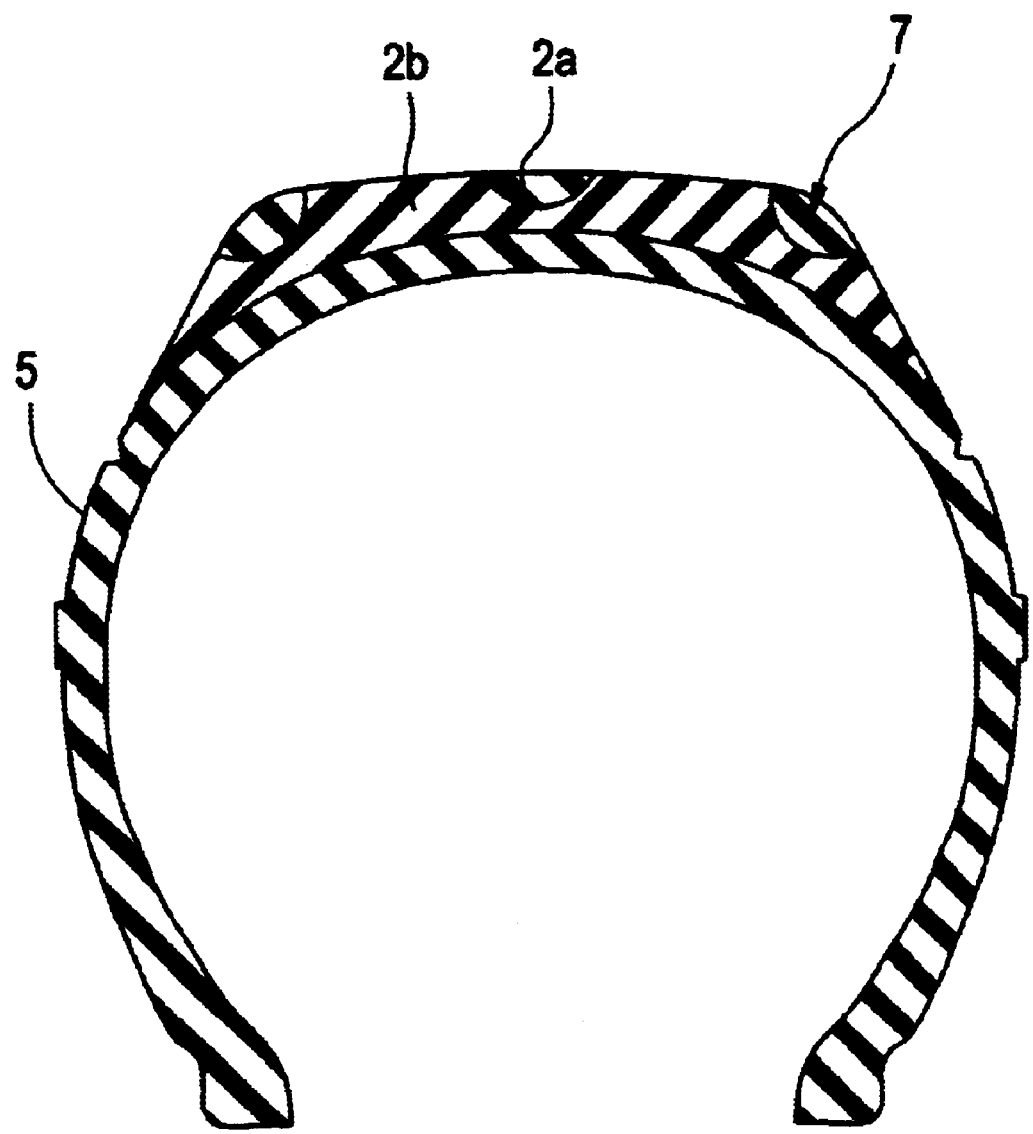
FIG. 2 is a cross sectional view of a vehicular pneumatic tire in accordance with the invention.

FIG. 2 depicts a cross-section through a vehicular pneumatic tire produced according to the process of the invention. The tread strip (7) was applied to the partial tire (5) in such a way that a strip of material (2b) containing carbon black was first wound onto the partial tire (5). This winding operation was so controlled that the strip of material (2b) partially acquired the total thickness of the tread strip (7), so that the radially outer limit of the tread strip (7) had a partial layer of a carbon black mixture.

Another strip of material (2a) containing, e.g., silica as a filler, was, in order to complete the total thickness of the tread strip, filled into the respective gaps left in the winding process of the strip of material (2b). Preferably, the material strips (2a) form the shoulder area of the tread strip, in order to ensure a good grip of the tire under wet skid conditions when negotiating curves.

This characteristic can be further improved when the strip of material (2b) forms only a slight proportion of the surface coming into contact with the roadway. An adequate grounding capacity of electrostatic charge is ensured thereby and at the same time assurance is given that the vehicular pneumatic tire has the tread strip characteristics, which are determined by the strip of material (2a). When the strip of material containing silica as a filler, the wet skid behavior and the resistance to roll are optimally affected.

Figure 3:
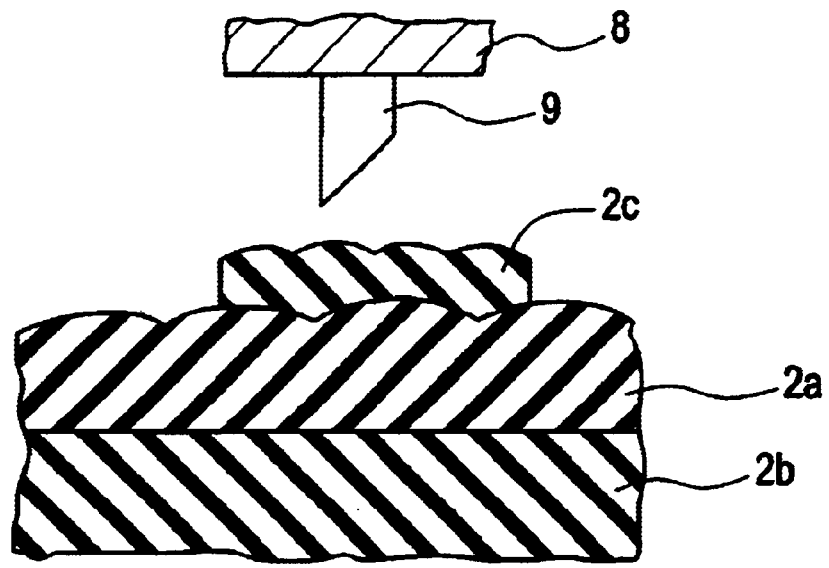
FIG. 3 is a partial cross sectional view of an unvulcanized tread strip, according to the invention
Figure 4:
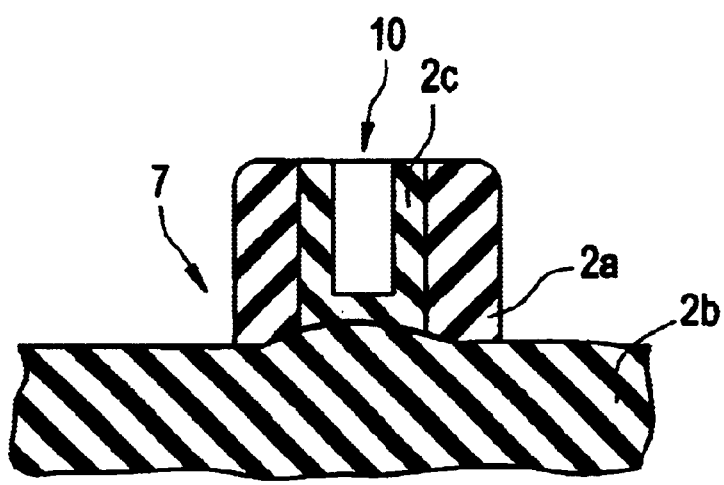
FIG. 4 is a partial cross sectional view of the vulcanized tread strip in FIG. 3.

FIG. 3 shows a cross-section of an unvulcanized tread strip which is formed by the strips of material (2a, 2b and 2c). The rubber mixtures (2b and 2c) are rubber mixtures containing carbon black, so that they have high electrical conductivity in the unvulcanized state. It is particularly advantageous when the mixtures (2b and 2c) have the same composition, so that the preparation of additional mixtures can be avoided.

The material strip (2b) is first wound onto the partial tire and, temporally insignificantly, the material strip (2a) is displaced. After completion of the winding of the rubber mixtures (2a and 2b), another strip of material (2c) is applied to the wound layer (2a). By means of coordinated control, the strip of material (2c) is applied in the area where, following the vulcanization, a fine incision (10) (lamella) is formed.

The formation of a fine incision takes place during the vulcanization in a not further described vulcanization form (8) with the appropriate configuration for profile bumps and grooves. In the depressed parts of the vulcanization form, which serve to form raised profile bumps on the tire, there are lamellar strips of metal (9), by means of which the fine incisions should be formed. Since the lamellar strip of metal (9) does not cut through the rubber mixtures, but rather displaces them, a lamella (10) is reproduced in the undepicted profile bump in the vulcanized state, the edges of which have the mixture composition of the strip of material (2c). The conductive mixture (2c) is displaced during the vulcanization operation and a conductive connection is developed from the surface coming into contact with the roadway all the way to another conductive layer (2b). It is also possible, however, to apply the strip of material (2c) where a profile groove is present in the finished trend pattern, so that, from the profile bumps the mixture composition (2c) provides the conductive contact beginning with the larger (2b) and extending to the surface coming into contact with the roadway.

With this process according to the invention, vehicular pneumatic tires are produced which have improved driving characteristics and can, at the same time, solve the problem of poor electrical grounding capacity. Furthermore, it is possible to achieve an improved driving behavior of the tire by way of skillful combination of the individual strips of material. These vehicular pneumatic tires can be produced in a technically uncomplicated and cost favorable manner, as both new tires and recapped tires.

Further variations and modifications will be apparent to those skilled in the art from the foregoing and are intended to be encompassed by the claims appended hereto.

German priority document 198 16 8497 is relied on and incorporated herein by reference.

We claim:

1. A process for producing a vehicular pneumatic tire comprising:
    winding a first strip of conductive material as a tread base onto a partial tire in numerous, essentially adjoining, windings running in a circumferential direction of the tire;
    winding a strip of low conductive material as a tread cap on top of said first strip of conductive material;
    applying a second strip of conductive material on the cap where a lamella is to be formed;
    forming the lamella during vulcanization so the second strip of conductive material is brought into contact with the first strip of conductive material through displacement of the strip of low conductive material.

2. The process according to claim 1 further comprising applying said first strip of conductive material and said strip of low conductive material simultaneously on a different area of the tire.

3. The process according to claim 1 further comprising applying said first strip of conductive material and said strip of low conductive material sequentially on the tire.

4. The process according to claim 1 wherein said strip of low conductive material is applied essentially at the same time as said first strip of conductive material.

5. The process according to claim 1 wherein said strip of low conductive material contains silica.

6. The process according to claim 1 wherein said first strip of conductive material contains carbon black.

7. The process according to claim 1 wherein the first and second strip of conductive material are comprised of the same material.

8. The process according to claim 1 wherein the first and second strip of conductive material are comprised of different material.

9. Process for producing a vehicular pneumatic tire comprising the following steps:
    applying a first strip of conductive material on a partial tire;
    applying a second strip of low conductive material on the first strip of conductive material;
    applying a third strip of conductive material on the second strip of low conductive material;
    vulcanizing the first, second, and third strip to form a tread strip;
    forming at least one lamella during the vulcanizing so that the third strip of conductive material is brought into contact with the first strip of conductive material through displacement of the second strip of low conductive material to make a conductive connection with the first strip of conductive material.

10. Process for producing a vehicular pneumatic tire comprising the following steps:
    winding a conductive material on a partial tire;
    winding a low conductive material on the conductive material;
    winding a second conductive material on the non-conductive material;
    vulcanizing the conductive material, low conductive material, and second conductive material to form a tread strip;
    pressing lamellar strips of metal into the second conductive material during the vulcanizing step so that that the second conductive material is carried radially inside to make a connection with the first conductive material.

* * * * *